United States Patent Office
2,853,397
Patented Sept. 23, 1958

2,853,397

PROCESS FOR IMPROVING THE FASTNESS TO LIGHT OF COLORED LACQUERS AND THE PRODUCTS THEREOF

Heinrich Seibert, Wilhelm Bunge, and Otto Bayer, Leverkusen, Germany, assignors to Farbenfabriken Bayer Aktiengesellschaft, Leverkusen, Germany, a corporation of Germany No Drawing. Application April 23, 1952
Serial No. 283,978

Claims priority, application Germany April 27, 1951

2 Claims. (Cl. 106—237)

The present invention relates to colored lacquers and, more particularly, it concerns the process for improving their fastness to light.

It has been found that the fastness to light of the coloring components, i. e. the dyestuffs or pigments contained in colored lacquer coatings, is considerably improved by means of urethanes.

Thus, for instance, dyestuffs which show a fastness to light of the first degree when tested according to the methods used in textile industry, will have in lacquer coatings a fastness to light that is generally 2–5 degrees higher if urethanes are present. As to the method used in textile industry for measuring the fastness to light of dyestuffs it is referred to "Verfahren, Normen und Typen für die Prüfung und Beurteilung der Echtheitseigenschaften von Färbungen auf Baumwolle, Wolle, Seide, Viskosekunstseide und Acetatkunstseide" edited by the "Echtheitskommission der Fachgruppe für Chemie der Farben- und Textilindustrie im Verein Deutscher Chemiker," 7th edition, 1935, page 5.

Such an improvement of the fastness to light of the coloring components contained in colored lacquer coatings is of great practical importance as the coloring components are usually selected in consideration of their fastness to light. The present invention allows of utilizing dyestuffs which despite their poor fastness to light, will provide colored lacquer coatings which are distinguished by excellent fastness to light.

In practicing the present invention urethanes may for instance be added to the colored lacquers prepared on the basis of suitable varnishes such as nitrocellulose, cellulose acetate, drying oils, shellac or the like, and on the basis of suitable coloring components, pigments or dyestuffs, such as acid or basic dyestuffs which are soluble in alcohol or oil. Another embodiment of the invention consists in mixing first the urethane with the dyestuffs or pigments, either by grinding them or making them into a paste depending on the physical properties of the components, and subsequently incorporating the mixture thus obtained into the lacquer.

By the term "urethanes" compounds are to be understood which contain the urethane grouping once or several times. Examples of urethanes are toluylene dibutyl urethane, 1,2,4,6-toluylene tributyl urethane, 3-hydroxyphenyl methyl urethane, 3-hydroxyphenyl phenyl urethane, furthermore urethanes obtainable by reacting phenyl isocyanate with ethanol amine, diethanol amine or methyl diethanol amine, and urethanes obtainable by causing monohydroxyl compounds such as methanol, butanol, benzyl alcohol or phenol to act on the reaction products prepared from polyalcohols and such an amount of diisocyanates that at least one mol of diisocyanate calculated on each hydroxyl group is present, finally alkyl or aryl urethanes from isocyanate modified polyesters and resinous condensation products of formaldehyde and phenylene diurethanes or 3-hydroxyphenyl urethanes. The urethanes may be substituted by chlorine, nitro groups or the like. Urethanes containing urea- or carbonamide groups as are obtained by causing polyisocyanates to react with mixtures of monovalent alcohols and amines are likewise suitable according to the invention.

The amount of the urethanes to be added according to the invention may vary in wide limits. The minimum amount depends on the nature of the urethane as well as on the dyestuff used. The proportion best suitable in a specific case can easily be found by preliminary tests.

In accordance with the present invention it is possible to employ instead of urethanes as such components which will result in the urethane grouping either before, during or after producing the lacquer coatings. Such components may also be used as the basis of the lacquer.

The invention will be illustrated by the following examples, but it should be understood that the invention is not limited to them. In these examples the parts are by weight unless otherwise stated.

*Example 1*

A nitrocellulose lacquer of common type is colored by adding 0.5% of an azo dyestuff obtained from aminoazotoluene and β-naphthol. 0.5% of the reaction product of phenyl isocyanate and methyl diethanol amine either as such or in the form of a solution in a mixture of alcohol and butyl acetate is added to the lacquer. Said small quantity of urethane results in an improvement of fastness to light by 2–3 degrees.

*Example 2*

5 parts of the reaction product obtained by reacting phenyl isocyanate and ethanol amine are dissolved in 100 parts of a spirit, nitro cellulose or cellulose acetate lacquer. The lacquer is colored with 0.5 part of the dyestuff prepared by coupling the diazotized 4,4'-diamino-3,3'-dimethoxyphenyl-diphenyl-methane with β-naphthol, the dyestuff being dissolved in benzene or dimethyl formamide.

*Example 3*

75 parts of a nitrocellulose lacquer are colored with an alcoholic solution of 0.3 part of Astraphloxin FF extra (Schultz, Farbstoff-Tabellen, 7th edition, vol. I, 1931, No. 930) and, thereafter, 25 parts of the tributyl urethane of a triisocyanate obtained by reacting 3 molecular parts of toluylene diisocyanate and 1 molecular part of trimethylol propane, are incorporated into the lacquer.

*Example 4*

40 parts of a hydroxyl group containing polyester prepared from 3 molecular parts of adipic acid and 4 molecular parts of trimethylol propane, and 20 parts of hexamethylene diisocyanate are dissolved in 90 parts of a mixture of equal parts of acetic ester and butyl acetate; this solution is colored with 0.75 part of Chrysoidin A-Base (Schultz, loc. cit., No. 27) which has been rendered soluble by 2 parts of oleic acid. The fastness to light of lacquer coatings produced with this lacquer is improved by 5 degrees as compared with that of the usual colored nitrocellulose lacquer coatings containing no urethane.

*Example 5*

40 parts of a polyester containing hydroxyl groups which has been prepared from 3 molecular parts of adipic acid and 4 molecular parts of trimethylol propane, and 20 parts of the polyisocyanate obtained by reacting 3 molecular parts of toluylene diisocyanate and 1 molecular part of trimethylol propane, are dissolved in 90 parts of a mixture of equal parts of acetic ester and butyl acetate. This lacquer solution is colored by the addition of 0.75 part of Patentblau V (Schultz, loc. cit., No. 826) which is preferably dissolved in methyl ethyl ketone or dimethyl formamide.

Example 6

100 parts of a polyester containing hydroxyl groups which has been prepared from 3 molecular parts of adipic acid and 4 molecular parts of trimethylol propane, and 75 parts of the reaction product of 3 molecular parts of hexamethylene diisocyanate and 1 molecular part of trimethylol propane are dissolved in 260 parts of butyl acetate. 150 parts of diisopropyl toloyl urethane and 0.5 part of Sulforhodamin B extra (Schultz, loc. cit., No. 863) are added to the lacquer solution.

Example 7

A lacquer solution of 25 parts of shellac in 100 parts of alcohol which is colored with 0.5 part of the dyestuff of Example 2 dissolved in benzene or dimethyl formamide, is mixed with 10 parts of the reaction product obtained by condensing 1 molecular part of 3-hydroxyphenyl ethyl urethane and 0.8 molecular part of formaldehyde in a sulfuric acid solution.

Example 8

10 parts of a diisocyanate modified polyester containing urethane groups prepared from toluylene diisocyanate and a hydroxyl group containing polyester derived from 3 molecular parts of adipic acid and 1 molecular part of trimethylol propane are incorporated into 80 parts of a nitrocellulose lacquer colored with 0.5 part of amidoazotoluene.

Example 9

174 parts of toluylene diisocyanate are mixed in portions with 94 parts of phenol at 145–150° C. while stirring and kept at this temperature for two hours. 148 parts of the reaction product are added at 50–60° C. to 179 parts of a 9.5% hydroxyl group containing polyester derived from 3 molecular parts of adipic acid and 4 molecular parts of trimethylol propane and being dissolved in 440 parts of ethyl acetate whereupon the mixture is kept at this temperature for four hours. 80 parts of this lacquer solution are colored with 0.5 part of Astraphloxin FF extra (Schultz, loc. cit., No. 930). A lacquer coating produced therefrom is dried at 140–150° C.

We claim:

1. A lacquer composition of improved fastness to light consisting essentially of an alcoholic solution of shellac, an organic dyestuff coloring material and the product formed by condensing 3-hydroxyphenyl ethyl urethane with formaldehyde in sulfuric acid solution.

2. The process of manufacturing improved organic dyestuff colored lacquers which comprises incorporating N-substituted urethanes of the group consisting of polyurethanes containing at least 2 urethane groups per molecule and urethanes having at least 1 urethane group bound to a cyclic radical.

References Cited in the file of this patent

UNITED STATES PATENTS

| 1,836,687 | Smith | Dec. 15, 1931 |
| 1,867,658 | Dreyfus | July 19, 1932 |
| 1,897,528 | Ott et al. | Feb. 14, 1933 |
| 2,019,892 | Carroll et al. | Nov. 5, 1935 |

FOREIGN PATENTS

| 122,272 | Germany | July 9, 1901 |
| 514,914 | Germany | Dec. 19, 1930 |